United States Patent Office 3,397,897
Patented Aug. 20, 1968

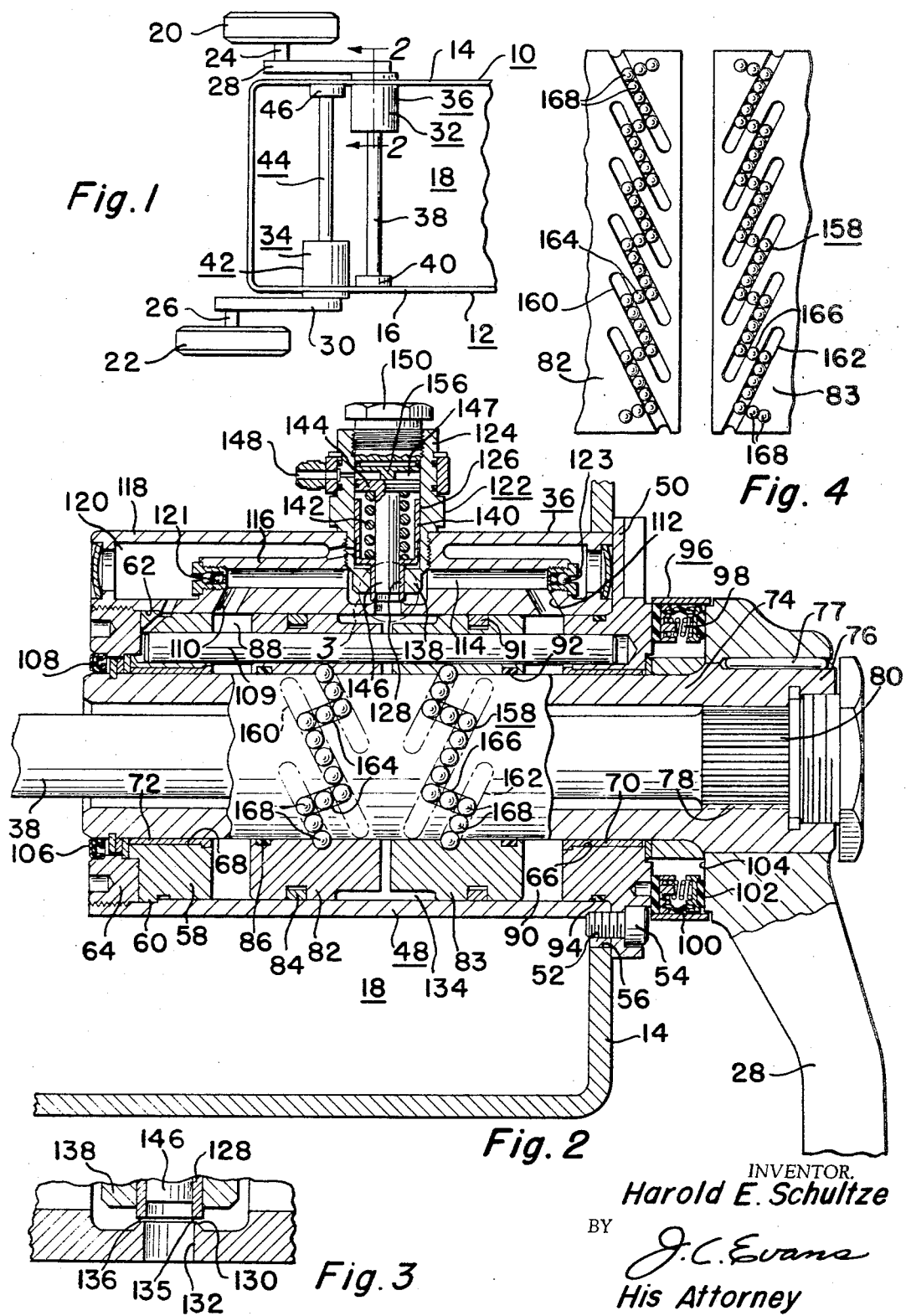

3,397,897
COMBINATION SPRING AND SHOCK
ABSORBING SUSPENSION UNIT
Harold E. Schultze, Dayton, Ohio, assignor to General
Motors Corporation, Detroit, Mich., a corporation of
Delaware
Filed Feb. 1, 1966, Ser. No. 524,047
5 Claims. (Cl. 280—124)

ABSTRACT OF THE DISCLOSURE

In preferred form, a compact suspension and damping system including a control arm which is connected to a road wheel at one end and a torsion bar and shock absorber assembly at the other end. The torsion bar resiliently supports a sprung mass on the road wheel. Limited rotative movement of the arm is damped by regulated fluid flow in a hydraulic, direct acting piston-cylinder shock absorber surrounding one end of the bar. A ball screw arrangement translates the arm's rotational motion into linear movement of the shock absorber piston to produce a predetermined damping effect.

---

This invention is directed to vehicle suspension systems and more particularly to an improved combination unit for resiliently supporting a sprung mass on an unsprung mass and damping relative movement between said masses.

In certain types of heavy-duty vehicles that are used in off-the-road environments, it is desirable to incorporate a suspension system between the sprung and unsprung masses of the vehicle that is relatively self-contained and locatable within the vehicle so that dust, mud and like foreign matter will be isolated effectively from the suspension unit.

Additionally, in vehicles of this type, it is desirable to include a substantial degree of damping between the sprung and unsprung masses as the vehicle traverses relatively rough terrain and, furthermore, it is desirable to maintain a substantial amount of spring support between the sprung and unsprung masses without producing a spring suspension system having an unusually extended dimensional configuration.

Accordingly, it is an object of the present invention to improve vehicle suspension systems for off-the-road vehicles and the like by the provision of a combination spring and shock absorber assembly that includes a double, direct-acting hydraulic shock absorber and a torsion bar spring component operatively associated as a common unit mountable interiorly of the hull of the vehicle.

A further object of the present invention is to improve suspension systems for off-the-road vehicles by the provision of a combination shock absorbing spring assembly including a double, direct-acting hydraulic shock absorber having a rotatable actuating tube adapted to be connected to an unsprung mass and further including a cylinder adapted to be connected to a sprung mass and wherein piston means are located in the cylinder and associated with coacting means between said actuating tube and said pistons to be reciprocated with respect to said cylinder for damping relative movement between the sprung and unsprung masses and wherein the combination further includes a torsion bar directed through said actuating tube having one end thereof fixed thereto and the opposite end thereof adapted to be connected to the sprung mass for resiliently supporting the sprung mass with respect to the unsprung mass.

Yet another object of the present invention is to improve off-the-road vehicles by the provision of a sprung mass having an exterior hull with spaced apart side walls that is operatively connected to an unsprung mass by means including a double, direct-acting hydraulic shock absorber with a damping fluid containing cylinder connected to one of the side wall of the hull interiorly thereof and wherein piston means are located within the cylinder for relative reciprocable movement with respect to the cylinder and wherein the unsprung mass is operatively connected to the piston means for reciprocating them by means including an actuating tube, said actuating tube further having an elongated torsion bar directed therethrough with one end connected to the tube and the opposite end fixedly secured to the other of the side walls of the hull to support resiliently the sprung mass on the unsprung mass.

Further objects and advantages of the present invention will be apparent from the following description, reference being had to the accompanying drawings wherein a preferred embodiment of the present invention is clearly shown.

In the drawings:

FIGURE 1 is a schematic view of a vehicle including the present invention;

FIGURE 2 is an enlarged view in vertical section taken along the line 2—2 of FIGURE 1;

FIGURE 3 is an enlarged view in section of area 3 in FIGURE 2; and

FIGURE 4 is a developed view of a ball screw component of the suspension assembly of the present invention.

Referring more particularly to the drawings and FIGURE 1, a vehicle 10 is illustrated of an off-the-road type such as an earth moving vehicle. The illustrated vehicle 10 includes a hull 12 having a pair of spaced apart side walls 14, 16 that define an interior space 18. On either side of the hull 12 are located ground engaging tires 20, 22 having axles 24, 26 connected, respectively, by road arms 28, 30 to suspension assemblies 32, 34 constructed in accordance with the principles of the present invention.

The suspension assembly 32 includes a double, direct-acting hydraulic shock absorber 36 secured to the side wall 14 and an elongated torsion bar 38 that has one end thereof connected to the shock absorber 36 and the opposite end thereof fixedly secured by a bracket 40 to the side wall 16.

The suspension assembly 34, which is like the suspension assembly 32, includes a double, direct-acting shock absorber unit 42 secured to the side wall 16 at a point offset from the bracket 40 and an elongated torsion bar 44 having one end thereof connected to the shock absorber 42 and the opposite end thereof fixedly secured by a bracket 46 to the opposite side wall 14.

Referring now to FIGURE 2, the relationship of the road arm, shock absorber assembly and torsion bar in the assembly is more specifically set forth. In FIGURE 2, the details of the suspension assembly 32 are set forth, with it being understood that the assembly 34 has like details.

The double, direct-acting shock absorber 36 includes an outer cylinder 48 located within the space 18 between the side walls 14 and 16. The cylinder 48 is open-ended and is closed at the outboard end thereof by an end plate 50 which is secured to a flanged end 52 of the cylinder 48 by suitable means such as screws 54. The end plate 50 includes flanged portions thereon that are secured by suitable means (not shown) to the side wall 14 about an opening 56 therein to fixedly secure the cylinder 48 to the side wall 14. The opposite open end of the cylinder 48 is closed by an end plate 58 that is located interiorly of the cylinder 48 and held against movement with respect thereto by a radially outwardly directed step portion 60 on the end plate 58 and is seated in an annular recess 62 formed on the inner surface of the cylinder 48. The plate 58 is held in place within the cylinder 48 by an annular threaded ring 64 that is threadably received within the inboard end of the cylinder 48.

The end plates 50, 58 have openings 66, 68, respectively, that are axially aligned and each of which respectively supportingly receives a sleeve bearing 70, 72. The bearings 70, 72 supportingly receive opposite ends of a rotatable actuating tube 74 which includes an outboard end 76 located exteriorly of the side wall 14 and secured to the road arm 28 by a pin 77. The actuating tube 76 receives the end of the torsion bar 38 that is directed into the shock absorber unit 36 and includes a splined segment 78 thereon into which a splined end 80 of the torsion bar 38 is received whereby the torsion bar 38 is fixed for movement with the actuating tube 74. Since the opposite end of the torsion bar 38 is fixed to the hull 12 by the bracket 40, the hull is resiliently supported by the torsion bar 38 through the actuating tube 74 and road arm 28 on the ground engaging tire 20. A like suspension of the hull 12 on tire 22 is produced by the torsion bar 44, shock absorber assembly 42 and road arm 30.

In accordance with certain principles of the present invention, within the cylinder 48 are located a pair of annular piston members 82, 83. The piston member 82 includes a seal member 84 in the outer periphery thereof that slidably sealingly engages the cylinder 48. An inner annular seal member 86 is supported on the inner periphery or bore of the piston 82 and slidably sealingly engages the outer surface of the actuating tube 74 to seal a variable volume fluid containing chamber 88 formed between the end plate 58 and the piston 82 within the cylinder 48. The piston 83 like piston 82 includes an outer annular seal member 91 in the outer periphery thereof that slidably sealingly engages the cylinder 48 and an inner annular seal member 92 that seals against the outer surface of the actuating tube 74 to form a second variable volume fluid containing chamber 90 within the cylinder 48 between the end plate 50 and piston 83.

Fluid leakage exteriorly of the chamber 90 through the end plate 50 is prevented by an annular seal member 94 that is seated in an outer peripheral surface of the end plate 50 in engagement in the cylinder 48 and leakage across the sleeve bearing 70 is prevented by an outboard seal assembly 96 including a spring 98 surrounded by a bellows seal 100 and operative to bias an outboard annular seal member 102 into sliding sealing engagement with surface 104 on the rotatable road arm 28.

The opposite variable volume chamber 88 is sealed by an annular seal member 106 that is held by a spring 108 in sealing engagement between the ring 64 against the outer periphery of the inboard end of the actuating tube 74.

The pistons 82, 83 are maintained in alignment within the cylinder 48 by elongated pins one of which is shown at 109 having the opposite ends thereof supported by the end plates 50, 58 and being directed through both of the pistons 82, 83 so as to define a guide track for controlled movement of the pistons within the cylinder so as to prevent undesirable cocking or canting of the pistons with respect to the cylinder.

The variable volume fluid chambers 88, 90 communicate through openings 110, 112, respectively, with a fluid passageway 114 formed in a radially outwardly directed semiarcuate segment 116 of the cylinder 48 which is enclosed by an arcuate outer surface portion 118 of the cylinder 48 to form a fluid reservoir 120. The fluid reservoir 120 is communicated by one-way check valve assemblies 121, 123 with the passageway 114 whereby make-up fluid can be directed from the reservoir 120 into the operative fluid system of the shock absorber 36.

Fitted within the cylinder 48 through the outer surface 118 and arcuate segment 116 thereof is a control valve assembly 122 including an outer tubular housing 124 threadably supportingly received by the cylinder 48. Within the housing 124 is located a tubular valving element 126 having an annular small diameter portion 128 that sits on a valve seat 130 surrounding an opening 132 that communicates the passageway 114 with a variable volume fluid chamber 134 between the pistons 82, 83 and within the cylinder 48. The small diameter portion 128 of the valving element 126 has a first effective annular area 134 thereon exposed to the chamber 134 and a second effective annular area 136 thereon exposed to the passageway 114. The small diameter end is guided within the housing 124 by a guide element 138 supported at one end thereof. Above the guide element 138 is located a large diameter portion 140 of the valving element 126 that is slidably guided by the inner surface of the housing 124 for relative reciprocable movement with respect thereto. Within the large diameter portion 140 is located a spring 142 that has one end thereof in engagement with the valving element and the opposite end thereof in engagement with a piston 144 having a stem portion 146 directed through the small diameter portion 128 of the valve 140 to be guided thereby. The piston 144 forms in cooperation with the body 124 a pressurizable chamber 147 which communicates through an inlet fitting 148 with a suitable source of control pressure. The valve body 144 further includes an adjustable screw element 150 threaded in one end thereof having a depending portion 156 which engages the upper surface of the piston 144.

By virtue of the illustrated control arrangement, the valving element 126 can be biased against the seat 130 to a greater or lesser degree manually by adjusting the screw 150 with respect to the valve body 124 to move the piston 144 downwardly and thereby cause the spring 142 to exert a greater force against the valving member 126. If desired, the control action of the valve assembly 122 can be controlled automatically by connecting a variable pressure source to the inlet fitting 148 so that a controlled variable force can be exerted on the piston 144 to vary the amount of closing force acting on the valve element 126 to force the small diameter end 128 thereof against the valve seat 130.

To obtain a fluid flow across the valve assembly 122 through the passageway 114 between the variable volume chambers 88, 90 and the central variable volume chamber 134, a ball screw arrangement 158 is operatively associated between the actuating tube 74 and the inner periphery or bore of each of the pistons 82, 83. More specifically, the ball screw arrangement 158 includes a plurality of offset elongated grooves 160 formed in the inner periphery or bore of the piston 82 and a like plurality of grooves 162 in the inner periphery of the piston 83 as best seen in the developed view of FIGURE 4. The grooves 160 overlie a plurality of staggered, transverse grooves 164 formed in and around the outer periphery of the actuating tube at one end thereof and a like number of transverse grooves 166 therein that are intersected by the grooves 162 in the piston 83. The grooves form a continuous track in which are located a plurality of ball bearings 168 that circulate within the grooves to cause a predetermined degree of relative reciprocable movement of the pistons 82, 83 with respect to the actuating tube 74 upon rotation thereof.

Thus, in addition to providing a spring support of the sprung mass represented by the hull 12 on the unsprung mass represented by the ground engaging tires 20, 22, as the vehicle 10 passes over rough terrain, the road arms 28, 30 are pivoted about the axis of the actuating tubes 74 to cause them to rotate upon the sleeve bearings 68, 70 and to drive the ball bearings 168 in the grooves between the actuating tubes 74 and the pistons 82, 83 to cause the pistons 82, 83 to be forced in a direction to reduce the volume of the fluid containing chamber 88, 90. On such compressive movement, the fluid in chambers 88, 90 is forced into the passageway 114 to produce a pressure on the annular surface 136 of the valve assembly 126 so as to raise the valve element 126 either against the manually selected force acting thereon or the automatic variable controlled pressure force directed thereon to raise the valve element off the seat 130 whereby the fluid is controllably directed into the expanding central chamber 134 of the shock absorber assembly. The valve element 126 thereby serves to produce a predetermined amount of damping of the relative movement between the sprung and unsprung masses. Likewise, on opposite rotative movement of the road arms, a rebound movement, the ball bearings will be operative to draw the pistons 82, 83 together and thereby force fluid from the variable volume chamber 134 against the annular valve area 134 on the valving element 126 which is moved eventually to allow fluid flow back through the passageway 114 and into the now expanding variable volume chambers 88, 90.

Another feature of the present invention is that the shock absorber 36 is located interiorly of the hull 12 and therefore as the vehicle is moved over rough terrain, mud, dust or other like foreign matter is shielded effectively from the shock absorber components.

While the embodiment of the present invention as herein disclosed constitutes a preferred form, it is to be understood that other forms might be adopted.

What is claimed is as follows:

1. In a vehicle suspension system, the combination of a cylinder secured to a spring mass of a vehicle, movable piston means having a bore disposed within said cylinder, a rotatable actuating tube concentrically directed through said cylinder and through the bore of said piston means, means including said cylinder defining fluid damping chambers located between said tube and said cylinder, said piston means separating said fluid damping chambers, valve passageway means fluidly connecting said damping chambers to regulate flow of hydraulic fluid therebetween, coacting means on an outer surface of said tube and on said bore of said piston means for producing reciprocation of said piston means relative to said cylinder and said tube upon rotation of said tube, an elongated torsion bar concentrically directed through said tube having one end thereof fixed to said tube for rotative movement therewith, the opposite end of said torsion bar adapted to be fixedly secured to the vehicle to produce a predetermined torsional spring action upon rotation of said tube.

2. In a vehicle suspension system, the combination of hydraulic shock absorber means including a cylinder and movable piston means in said cylinder reciprocable relative to said cylinder, a rotatable actuating tube directed through said cylinder and piston means, coacting means on said tube in said piston means for producing reciprocation of said piston means with respect to said cylinder upon rotation of said tube, said coacting means including a plurality of spaced grooves in said piston means, a plurality of spaced grooves in said rotatable tube, and a plurality of balls disposed within said piston means, grooves and said tube grooves operative upon rotation of said tube to reciprocate said piston means with respect to said cylinder, an elongated torsion bar directed through said tube having one end thereof fixed to said tube for rotative movement therewith, the opposite end of said torsion bar adapted to be fixedly secured to produce a predetermined torsional spring action upon rotation of said tube.

3. In a vehicle suspension system, the combination of hydraulic shock absorber means including a cylinder and movable piston means in said cylinder reciprocable relative to said cylinder, a rotatable actuating tube directed through said cylinder and piston means, coacting means on said tube and said piston means for producing reciprocation of said piston means with respect to said cylinder upon rotation of said tube, said piston means including a pair of spaced apart pistons, each of said spaced apart pistons cooperating with said cylinder to form a plurality of spaced apart variable volume fluid containing chambers, passageway means for interconnecting said variable volume chambers, and valve means in said passageway means for controlling fluid flow through said passageway means, said coacting means on said rotatable actuating tube and said piston means including means for moving said separate pistons in opposite directions to force fluid through said passageway means and said valve means into one of said variable volume chambers to produce a predetermined damping of rotation of said actuating tube, an elongated torsion bar directed through said tube having one end thereof fixed to said tube for rotative movement therewith, the opposite end of said torsion bar adapted to be fixedly secured to produce a predetermined torsional spring action upon rotation of said tube.

4. In a vehicle suspension system, the combination of hydraulic shock absorber means including a cylinder and movable piston means in said cylinder reciprocable relative to said cylinder, a rotatable actuating tube directed through said cylinder and piston means, coacting means on said tube and said piston means for producing reciprocation of said piston means with respect to said cylinder upon rotation of said tube, said coacting means including a plurality of spaced grooves in said piston means, a plurality of spaced grooves in said rotatable tube, and a plurality of balls disposed within said piston means grooves and said tube grooves operative upon rotation of said tube to reciprocate said piston means with respect to said cylinder, an elongated torsion bar directed through said tube having one end thereof fixed to said tube for rotative movement therewith, the opposite end of said torsion bar adapted to be fixedly secured to produce a predetermined torsional spring action upon rotation of said tube, a road arm, means for fixedly securing said road arm to said actuating tube, and bearing means on said cylinder for rotatably supporting said road arm and actuating tube with respect to said cylinder.

5. In a vehicle suspension system, the combination of hydraulic shock absorber means including a cylinder and movable piston means in said cylinder reciprocable relative to said cylinder, a rotatable actuating tube directed through said cylinder and piston means, coacting means on said tube in said piston means for producing reciprocation of said piston means with respect to said cylinder upon rotation of said tube, said piston means including a pair of spaced apart pistons, each of said spaced apart pistons cooperating with said cylinder to form a plurality of spaced apart variable volume fluid containing chambers, passageway means for interconnecting said variable volume chambers, valve means in said passageway means for controlling fluid flow through said passageway means, said coacting means on said rotatable actuating tube and said piston means including means for moving said separate pistons in opposite directions to force fluid through said passageway means and said valve means into one of said variable volume chambers to produce a predetermined damping of rotation of said actuating tube, a cylinder including reservoir means, and one-way valve means communicating said reservoir means with said passageway means to allow makeup flow of fluid into said passageway means and said variable volume fluid chambers, an elongated torsion bar directed through said tube having one end thereof fixed to said tube for rotative movement therewith, the opposite end of said torsion bar adapted to be fixedly secured to produce a predetermined torsional spring action upon rotation of said tube.

References Cited

UNITED STATES PATENTS

| | | | |
|---|---|---|---|
| 3,262,522 | 7/1966 | Johnson | 180—9.2 X |
| 3,047,283 | 7/1962 | Kivell | 267—15 |
| 3,157,394 | 11/1964 | Kelley | 180—9.2 |

PHILIP GOODMAN, *Primary Examiner.*